(12) United States Patent
Billarant et al.

(10) Patent No.: US 7,159,921 B2
(45) Date of Patent: Jan. 9, 2007

(54) LOOPED FABRIC ROOF

(75) Inventors: Fabrice Billarant, Nantes (FR); Louis Raimbault, La Chapelle sur Erdre (FR); Stéphane Westeel, Bondues (FR); Patrick Delsart, Deluz (FR); Pavel Hammer, Mössingen/Oschingen (DE)

(73) Assignee: Aplix (FR)

( * ) Notice: Subject to any disclaimer, the term of this patent is extended or adjusted under 35 U.S.C. 154(b) by 0 days.

(21) Appl. No.: 10/482,249

(22) PCT Filed: Jun. 27, 2002

(86) PCT No.: PCT/FR02/02233

§ 371 (c)(1),
(2), (4) Date: Jun. 1, 2004

(87) PCT Pub. No.: WO03/002377

PCT Pub. Date: Jan. 9, 2003

(65) Prior Publication Data

US 2004/0207225 A1    Oct. 21, 2004

(30) Foreign Application Priority Data

Jun. 27, 2001 (FR) .................................. 01 08452

(51) Int. Cl.
*B60R 13/01* (2006.01)
(52) U.S. Cl. ..................................... 296/39.1; 296/210
(58) Field of Classification Search ............... 296/39.1, 296/214, 210
See application file for complete search history.

(56) References Cited

U.S. PATENT DOCUMENTS

| | | | | |
|---|---|---|---|---|
| 3,505,772 A * | 4/1970 | De Claire et al. ............ 52/511 |
| 4,119,794 A * | 10/1978 | Matsuki ..................... 174/68.1 |
| 4,467,625 A * | 8/1984 | Kurz ........................... 66/193 |
| 4,840,832 A * | 6/1989 | Weinle et al. .............. 428/156 |
| 5,058,245 A | 10/1991 | Saito ........................... 24/306 |
| 5,280,991 A * | 1/1994 | Weiland .................... 296/214 |
| 5,667,896 A * | 9/1997 | Carter et al. ............. 428/425.6 |
| 5,736,214 A * | 4/1998 | Billarant ...................... 428/92 |
| 6,000,749 A * | 12/1999 | Adam et al. ................ 296/214 |
| 6,018,852 A * | 2/2000 | Coslovi et al. ............... 24/442 |
| 6,076,238 A | 6/2000 | Arsenault et al. ............ 24/452 |
| 6,179,359 B1 * | 1/2001 | Clauson et al. ............ 296/39.1 |
| 6,213,542 B1 * | 4/2001 | Clift .......................... 296/214 |
| 6,322,658 B1 * | 11/2001 | Byma et al. ............. 156/309.9 |
| 6,490,788 B1 * | 12/2002 | Carter et al. ................. 29/854 |
| 6,857,809 B1 * | 2/2005 | Granata ...................... 403/121 |
| 2001/0037854 A1 * | 11/2001 | Byma et al. ............. 156/309.9 |

FOREIGN PATENT DOCUMENTS

| | | |
|---|---|---|
| DE | 298 21 884 U1 | 4/2000 |
| DE | 100 30 078 A1 | 5/2001 |
| EP | 0 813 277 A2 | 12/1997 |

(Continued)

*Primary Examiner*—Lori L. Coletta
(74) *Attorney, Agent, or Firm*—Renner, Kenner, Greive, Bobak, Taylor & Weber

(57) ABSTRACT

The invention relates to a motor vehicle having a housing, at least one part of the internal surface of which is covered by at least one lining panel (1), and objects (3, 4, 5) such as cables, flexible printed circuits, flexible flat cables or anti-vibration blocks which are disposed between the lining panel (1) and the housing. One of the faces of the lining panel(s) (1) is provided with loops and male anchoring elements, particularly hooks (8), which are used to fix the objects and/or housing, with which said hooks are associated, to the panel(s).

16 Claims, 2 Drawing Sheets

| | FOREIGN PATENT DOCUMENTS | | | FR | 2 423 666 | 11/1979 |
|---|---|---|---|---|---|---|
| EP | 1 118 443 A1 | 7/2001 | | WO | WO 98/02331 | 1/1998 |
| FR | 1.515.491 | 3/1968 | | | | |
| FR | 2.116.704 | 7/1972 | | * cited by examiner | | |

LOOPED FABRIC ROOF

TECHNICAL FIELD

The present invention relates to automobile vehicles, for example a car or a bus, having a body of which at least a part of the inner surface is covered by a covering or lining.

BACKGROUND ART

In general these coverings, for example, on the vehicle top or roof or on the doors of the vehicle, are in the form of panels of a foam material, for example, a polyurethane foam.

In order to be placed against the inner surface of the vehicle body, the covering panels currently have to be held in place by a robot or by hand to permit the operatives to fix them, for example, by means of the door handles, side holding handles at the top of each window, sun visors and other ceiling lights, which, in cooperation with holes in the panels, hold the covering panels against the body when the vehicle is in its finished state. Automobile vehicles today have more and more electronic systems and it consequently becomes more and more necessary to pass the electrical cables between the body and the covering panels.

Cables or even soundproofing accessories are already known which are stuck directly to the covering panels, for example, on the vehicle top or the door, and which can then no longer be repositioned. They can consequently not easily be removed and repositioned for maintenance or replacement.

The document DE 29821884 in the name of Lear describes a covering panel comprising over its whole face facing the vehicle top (directed towards the upper part of the vehicle) a fibrous material with bristles which are intended to cooperate with hooks to fix cables to this face.

The function of the hooked and bristled device consists in that case of positioning the cables on the upper face of the panel, between this panel and the vehicle top. The panel itself is fixed to the body by other fixing means, in particular screws, which are sufficiently strong to hold the panel on the body throughout the life of the car, and in particular to withstand jolts, sudden braking, etc. without become detached.

This manner of fixing the cables and the panel has the disadvantage that the cables are not fixed to the panel as well as the panel is fixed to the body. Thus the cables can easily tend to become detached as the vehicle moves, for example, after a jolt or untimely sudden braking. Similarly, when it is desired to mount the cables in advance on the panel and then to transport the panel with cables pre-mounted to the site where the panel is mounted on the body, expensive measures are required to ensure that cables pre-mounted on the panel do not become detached therefrom during the journey. Furthermore, when the components are mounted on the panel it is necessary to hold this panel with raised arms, the resistance to the panel with its components becoming unhooked from the body being insufficient until the panel has been fixed with screws.

The present invention aims to overcome these disadvantages by proposing a new type of panel which permits on the one hand the panel to be temporarily fixed to the body with sufficient force to resist unhooking because of the weight of the vehicle top fitted with all its components and consequently without it being necessary to hold the vehicle top with raised arms before it is finally fixed to the body by, for example, screw means, and on the other hand permits sufficient fixing of the components to the panel to be assured in order to resist jolts, sudden braking, etc., but to do so with the same ease of usage as in the prior art devices and in particular while retaining the advantage of being able to make a simple modification to the positioning of these components (cables, blocks, etc.).

Covering the whole surface of the vehicle top with, for example, a non-woven fabric, and its engagement in pre-positioned gripping elements on the structure of the vehicle does not permit, amongst other things, temporary holding of the vehicle top on the assembly line as an aid to mounting before final fixing. In fact, this application cannot be achieved with the non-woven fabrics generally used in the automobile. From the actual nature of these non-woven fabrics, which are generally composed of interlaced or needled fibres, the resistance to unhooking, in the perpendicular direction, of the non-woven fabric/gripping element combinations cannot bear the weight of a vehicle top fitted with all its components (cables, flat cables, soundproofing blocks made from foams of different densities, side airbags and other electronic components).

Most producers of vehicle tops offer automobile manufacturers vehicle tops pre-fitted with all their components (modules) so that they only have to be fixed to the body of the vehicle. It is understood in this respect that the components should be fixed to the vehicle top with sufficient strength to withstand the conditions of transportation. In contrast to a mesh/gripping element combination, the mechanical strengths (traction-peeling-perpendicular unhooking) of a non-woven fabric/gripping element to fix the elements would be too weak to keep all the components in place during transportation for just-in-time factories.

The present invention aims to overcome the disadvantages mentioned above by proposing a vehicle in which, on the one hand, the covering panels, for example at the vehicle top, can be positioned easily and in a stable manners covering the inner surface of the body of the vehicle and in which, on the other hand, various objects which are intended to be disposed between this covering panel and the body, for example, cables, printed circuits, flat cables or foam blocks to sound-proof the vehicle assembly and prevent the covering panel vibrating, can be fixed to the panel in a simple manner with the possibility of subsequent repositioning if the first position in which the objects have been fixed is not the correct one.

DISCLOSURE OF THE INVENTION

According to the invention the automobile vehicle having a body, of which at least a part of the inner surface is covered by at least one covering panel, objects such as cables, flexible printed circuits, flexible flat cables or anti-vibration blocks being disposed between the covering panel and the body, is characterised in that the said at least one covering panel has on one of its faces a knitted fabric or looped knitted fabric, having a base and loops issuing from the base, and male hooking parts, in particular hooks, are provided, associated with the objects and/or with the body in order to permit them to be fixed to the said at least one panel, the looped knitted fabric covering substantially the whole face of the panel.

In thus providing the face of the covering panel intended to face the inner surface of the body with female elements, for example loops, easy fixing of the cables, the flexible printed circuits (FPCs or FFCs) or the foam blocks to prevent vibration will be possible by associating or fixing these different objects by corresponding associated hooks.

Thus the cables, for example, will be well positioned, i.e. with a good resistance to being pulled off, with the possibility of modifying their position. The same will be true for the vibration-damping blocks. Furthermore, by also providing metal structures of the body with hooked elements, it will be possible easily to position the covering panel on the body during installation of, for example, the handles, the sun visor or the ceiling lights, without having to hold the panel using a robot or an operative as is the case at present.

By way of indication, the table below reproduces results of tests carried out in accordance with the standard NF G91-103 with male mushroom-heads APLIX 224 available from the company APLIX SA, France and, on the one hand, a looped mesh APLIX 035 also available from APLIX SA, France, and, on the other hand, a non-woven fabric NOL-FRA 41 available from the company Nolar Industrie, Canada, which permit differences in performance to be evaluated:

| In combination with mushroom-heads APLIX 224 | Traction | Peeling | Perpendicular unhooking |
|---|---|---|---|
| Looped mesh APLIX 035 35 gr/m² | 7.82 N/cm² | 1.23 N/cm | 5.08 N/cm² |
| Non-woven fabric 50 gr/m² | 1.44 N/cm² | 0.35 N/cm | 1.67 N/cm² |

According to one particularly preferred embodiment of the invention, the face of the covering panel intended to face the inner surface of the body is covered with a knitted fabric or a looped knitted fabric applied to the covering panel, for example, by gluing, over-moulding, foaming or any other known lamination process.

In accordance with a preferred embodiment of the invention, the looped knitted fabric weighs between 20 g/m² and 200 g/m², preferably between 30 and 50 g/m².

According to a preferred embodiment which is particularly simple to produce and is strong, the looped knitted fabric has a base formed by interlacing of weft threads and chain-stitched threads (or stitch wale) and loops issuing from the base, in particular produced on a three-bar loom.

In particular the looped knitted fabrics used in disposable nappies at the waist closures are particularly well adapted to this application.

In the present invention the phrase "loops over substantially the whole surface" is understood to mean that the surface in question does not have any loop-free zone, a loop-free zone being a zone in which no loop bottom parts issue and which extends over a distance substantially greater than a usual distance, in the field of self-gripping loops, between two bottom parts of consecutive loops, the zone between these two loop bottom parts not being considered as a loop-free zone. In particular, it can be stated that a loop-free zone is a zone having a surface greater than one cm² and not having any loop bottom parts.

According to one improvement of the invention the vehicle has at least one flexible flat cable having a respective base substrate on which are disposed electrical circuits, in particular by etching or printing; and on at least one of the faces of the substrate, preferably on each face of the substrate, a strip, from which hooking elements issue, is fixed, in particular glued.

It is thus possible, on one side, to fix the flexible cable to one face of the lining panel and on the other hand it is possible to stack the flexible cables one on top of another, which makes it possible to save space, to change a faulty cable in the stack with ease and easily to install the cables in the correct place.

BRIEF DESCRIPTION OF THE DRAWINGS

One embodiment of the invention given merely by way of example is now described with reference to the drawing in which.

PREFERRED EMBODIMENT FOR CARRYING OUT THE INVENTION

Figure 1:
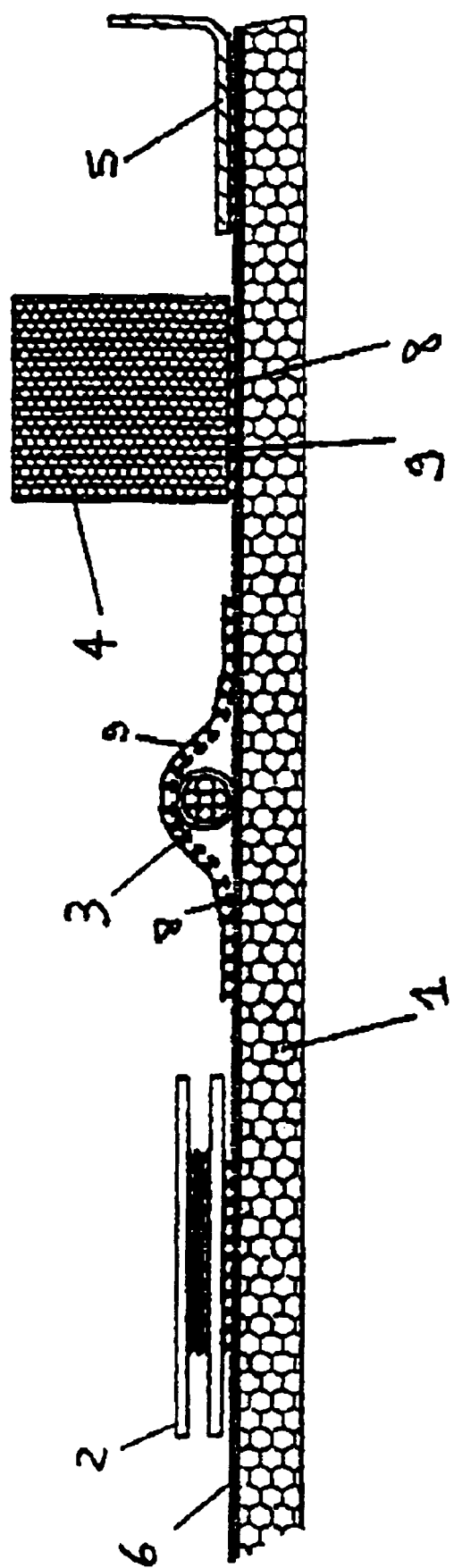
FIG. 1 illustrates a cross-sectional view of a vehicle at the level of the vehicle top, various elements being located between the upper face of the panel and the body of the automobile vehicle.
Figure 2:
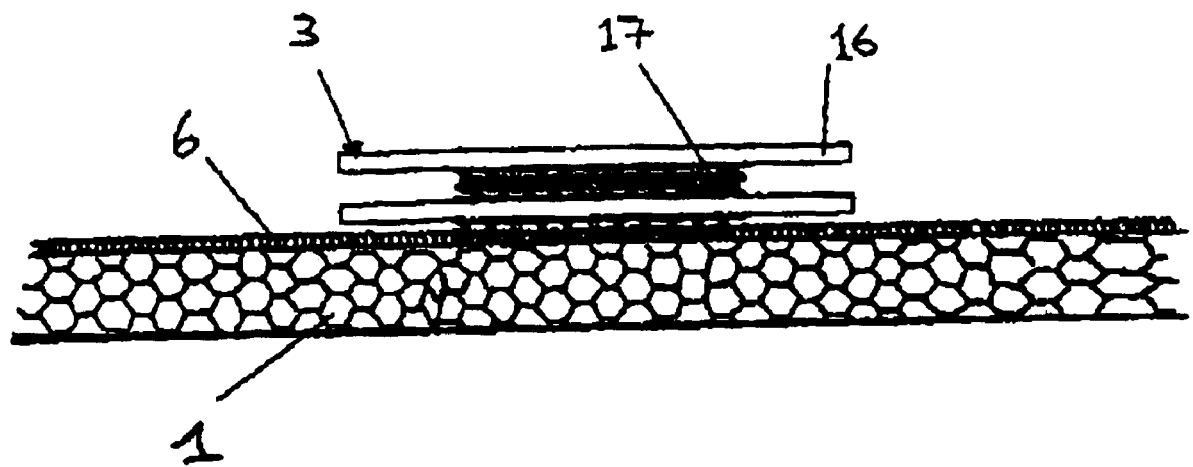
FIG. 2 illustrates a larger scale cross-sectional view of a part of FIG. 1.
Figure 3:
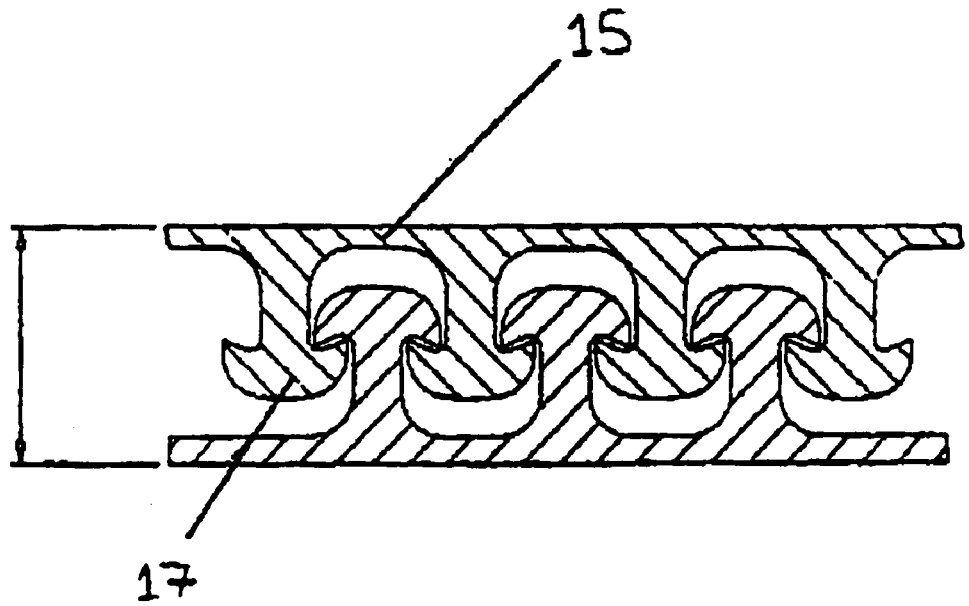
FIG. 3 is a larger scale view of the hooked strips fixed to the substrates of the assembly forming a flexible cable.

FIG. 1 illustrates a part of a panel 1 made from a foam material, for example a polyurethane foam (PUR). This panel is intended to be interposed between the inner surface of the roof or vehicle top of the body (not shown in the figure) of an automobile and the driver. On the inner face (in the figure) of the panel it is possible to provide a velour or other fabric intended to give an aesthetic character to the whole, this velour forming the inside of the vehicle as seen by the driver.

Between the body of the automobile and this panel 1 provision is made for the passage of one or a plurality of electrical cables 3, one or a plurality of flexible printed circuits (FPCs) 2, one or a plurality of flexible flat cables (FFCs) as well as one or a plurality of blocks 4, also made from foam, serving to dampen the vibrations of the panel with respect to the body. The upper surface, or surface facing the body, of the panel 1 has a looped fabric 6. The looped fabric 6 is a fabric knitted on three bars, comprising weft threads, stitch wales and loops knitted in the interlacing of weft threads and stitch wales. The knitted fabric can, for example, be made from polyamide, polyester or polypropylene. It may be provided with a support of the non-woven paper film, adhesive film type, in particular of a thickness between 20 and 100μ. The weight of the fabric is between 20 g/m² and 200 g/m², preferably between 30 and 50 g/m². The threads, and in particular the loop threads, have a denier between 40 dtx/10 strands and 78 dtx/20 strands. The looped fabric 6 is glued on the upper face of the panel 1. This looped fabric could also be fixed to the panel by over-moulding, foaming or any other lamination process which is known per se.

The body of the automobile has, for example, metal structures 5 on which a strip 9 is fixed which has male elements, in this case mushroom-shaped hooks 8, which will cooperate with the loops of the looped fabric. The strip 9 with hooks 8 is stuck to one or a plurality of metal structures 5 of the body. Thus, when the panel 1 is applied to the body, it can be held fixed to the body and the handles, sun visors and ceiling lights can be installed without having to hold the panel against the body manually or by using a robot. Furthermore, if, during a first period, the panel has been badly positioned with respect to the body and with respect to the locations provided for the ceiling light, the sun visors or the handles, this panel can easily be repositioned by removing it and repositioning it using the loops and hooks.

A system is thus provided which permits more precise positioning than in the case where the panel is held manually and which is simpler than the case where a robot is used.

The vibration-damping block or blocks 4 also have, on one of their faces, a strip 9 with hooks 8 similar to that disposed on the metal structure of the body and which also serves to fix these blocks 4 to the panel 1.

A strip 9 with hooks 8 is similarly provided to fix the cable or cables 3 to the panel 1. As shown in the figure it is possible, for example, to provide a strip 9 with hooks of a large dimension with respect to the transverse dimension of the cable 3 so as to sandwich the cable 3 between the panel 1 and the strip 9 with hooks 8, the lateral parts of the strip being fixed to the loops of the panel 1 while the central part covers the cable or cables 3 and holds them against the panel 1. It would also be possible to make provision to enclose the cables 3 directly with a hooked strip and to fix these cables to the vehicle top by means of the hooks of the strip wound around the cable.

The flexible printed circuits (FPCs) 2 or the flexible flat cables (FFC for Flexible Flat Circuit [sic]) have hooked strips on one or more of their faces. As in the case of the block 4 or the metal structure 5, these hooked strips are simply stuck to the surface of the printed circuit in a very standard manner. It is thus possible to fix the printed circuit to the panes 1 by means of a hooked strip. Similarly, as shown in the figure, the printed circuits can be stacked one on top of the other, causing the mutually facing hooks of the hooked strips of two flexible printed circuits disposed one on top of another to latch together.

Finally, it is also self evident that the looped fabric could be replaced by a hooked strip stuck or laminated to the panel 1 instead of the loops, and the hooks would latch into the hooks of the strips 9 in order to achieve a fixing arrangement which was also detachable and of good quality or which cooperated with loops of a looped fabric stuck or laminated to the surface of each object to be fixed to the panel.

The flexible cable 3 (FPC or FFC) is formed from a flat substrate 16 on which the electrical circuits are printed or etched in a synthetic material which is conventionally used in the field, the integrated or electrical circuits being embedded in the synthetic material of the cable. On at least one of the faces of the substrate 16 and preferably on each of the faces of the substrate 16 a strip 15 with hooks 17 is fixed, for example, by means of a standard adhesive. The hooks 17 can be of any form, in particular hooks, mushroom-heads, etc., well known in the field of self-gripping means. The strip or strips 15 with hooks 17 are made from synthetic material and formed by extrusion and drawing as is well known. Hooks of this type are also known, for example, in the field of disposable nappies for the closure system of the disposable nappies. They can be made from PT, PE, PVC, PA or similar synthetic material. The total height of the hooked strip is preferably between 0.3 mm and 1.5 mm, preferably between 0.5 mm and 0.9 mm, the thickness of the base strip being no greater than 0.5 mm. The thickness of the hooks or spears is between 0.15 mm and 0.45 mm, preferably 0.3 mm. The width of the hooks or spears is between 0,3 mm and 1.2 mm, preferably 0.6 mm.

The hooked strip can be produced, for example with spear-type hooks which are extruded or moulded in synthetic material, for example polypropylene, having a density between 50 and 300/cm$^2$, in particular hooked strips such as those used in closure devices in the waist region of disposable nappies.

The invention claimed is:

1. Automobile vehicle having a body, of which at least a part of the inner surface is covered by a covering panel, objects being disposed between the covering panel and the body, wherein said covering panel has a face, on which is fixed a loop knitted fabric having a base, made of an interlacement of weft threads and chain stitch threads, and loops knitted in the base and male hooking parts being provided associated with said objects for their fixation to said panel.

2. Vehicle as claimed in claim 1, characterised in that the face of the covering panel intended to face the inner surface of the body is covered with a looped knitted fabric applied to the covering panel.

3. Vehicle as claimed in claim 2, characterised in that the knitted fabric has a weight between 20 g/m$^2$ and 200 g/m$^2$.

4. Vehicle as claimed in claim 1, wherein said knitted fabric is produced on a three-bar loom.

5. Vehicle as claimed in claim 1, characterised in that the male hooking parts are in the form of strips, from which hooking elements issue, distributed uniformly on the surface of the strip.

6. Vehicle as claimed in claim 5, characterised in that the hooking elements are uniformly distributed at a spacing of 50 to 300/cm$^2$.

7. Vehicle as claimed in claim 6, characterised in that the hooking elements are produced by extrusion.

8. Vehicle as claimed in claim 1, having at least one flexible flat cable having a respective base substrate on which are disposed electrical circuits, characterised in that on at least one of the faces of the substrate, a strip, from which hooking elements issue, is fixed.

9. Vehicle as claimed in claim 8, characterised in that at least two flat cables are provided superimposed one on top of the other by the latching of hooking elements of one of the cables into the hooking elements of the other cable.

10. Automobile vehicle defined in claim 1, wherein said looped knitted fabric wholly covers said face of said panel.

11. Automobile vehicle as defined in claim 4, wherein said fabric is a three bar loom produced fabric.

12. Automobile vehicle as defined in claim 5, wherein said hooking elements comprise hooks or mushroom-heads.

13. Automobile vehicle as defined in claim 3, wherein said knitted fabric has a weight between 20 g/m$^2$ and 50 g/m$^2$.

14. Automobile vehicle as defined in claim 8, wherein said electrical circuits are disposed on said base by etching or printing.

15. Automobile vehicle as defined in claim 8, wherein said strip is fixed to each face of said substrate.

16. Automobile vehicle as defined in claim 8, wherein said strip is fixed to said substrate by glue.

* * * * *